United States Patent [19]

Chang et al.

[11] Patent Number: 5,974,449
[45] Date of Patent: Oct. 26, 1999

[54] APPARATUS AND METHOD FOR PROVIDING MULTIMEDIA MESSAGING BETWEEN DISPARATE MESSAGING PLATFORMS

[75] Inventors: Jack H. Chang, Sunnyvale; Raymond L. Tong, Milpitas, both of Calif.

[73] Assignee: Carmel Connection, Inc., Fremont, Calif.

[21] Appl. No.: 08/853,290

[22] Filed: May 9, 1997

[51] Int. Cl.$^6$ .................................................. G06F 13/38
[52] U.S. Cl. ........................................ 709/206; 709/207
[58] Field of Search ..................................... 709/207, 206

[56] References Cited

U.S. PATENT DOCUMENTS

| | | | |
|---|---|---|---|
| 5,115,326 | 5/1992 | Burgess et al. | 358/440 |
| 5,333,266 | 7/1994 | Boaz et al. | 395/200.36 |
| 5,349,636 | 9/1994 | Irribarren | 379/89 |
| 5,377,191 | 12/1994 | Farrell et al. | 370/401 |
| 5,479,411 | 12/1995 | Klein | 379/88 |
| 5,530,740 | 6/1996 | Irribarren et al. | 379/89 |
| 5,557,659 | 9/1996 | Hyde-Thomson | 379/88 |
| 5,608,786 | 3/1997 | Gordon | 370/352 |
| 5,633,916 | 5/1997 | Goldhagen et al. | 379/67 |
| 5,647,002 | 7/1997 | Brunson | 380/49 |
| 5,675,507 | 10/1997 | Bobo, II | 395/200.36 |
| 5,737,395 | 4/1998 | Irribarren | 379/88.13 |
| 5,740,231 | 4/1998 | Cohn et al. | 379/89 |
| 5,838,458 | 11/1919 | Tsai | 358/402 |

OTHER PUBLICATIONS

Microsoft Press Computer Dictionary, 3rd Edition, p. 366 (PING definition).

Primary Examiner—Frank J. Asta
Assistant Examiner—Daniel Patru
Attorney, Agent, or Firm—D'Alessandro & Ritchie

[57] ABSTRACT

The invention is an apparatus and method for receiving a message having a first format and for converting the message from the first format to a second format that is compatible for reception by a messaging interface having a destination address corresponding to an intended recipient. In the preferred embodiment, a computer system is used to receive and send messages between messaging interfaces and networks which may be dissimilar from each other. A variety of network interfaces is used to communicate with the networks and which may optionally have a first interface and a second interface for interfacing to a first and second network, respectively. The messages may optionally be presented through a web page. A forwarding program or equivalent may be used to forward subscriber messages to or from remote locations served by a remote computer system, enabling a messaging user to use the remote computer system as a local access point. A browser interface may be optionally used to control messages presented by the computer system on a real-time basis using hyperlink commands. The computer system may also be used in conjunction with: a recipient notification program or equivalent device that determines when a recipient is logged on to a network and if so, provides any messages stored in the recipient's mailbox to the recipient; a connection notification program or equivalent device that notifies the computer system that a recipient is logged on to a network so that the computer system can send messages stored in the recipient's mailbox, if any; and an apparatus and method for sending and receiving a destination address including Internet addresses using a DTMF generator such as a standard telephone keypad.

7 Claims, 10 Drawing Sheets

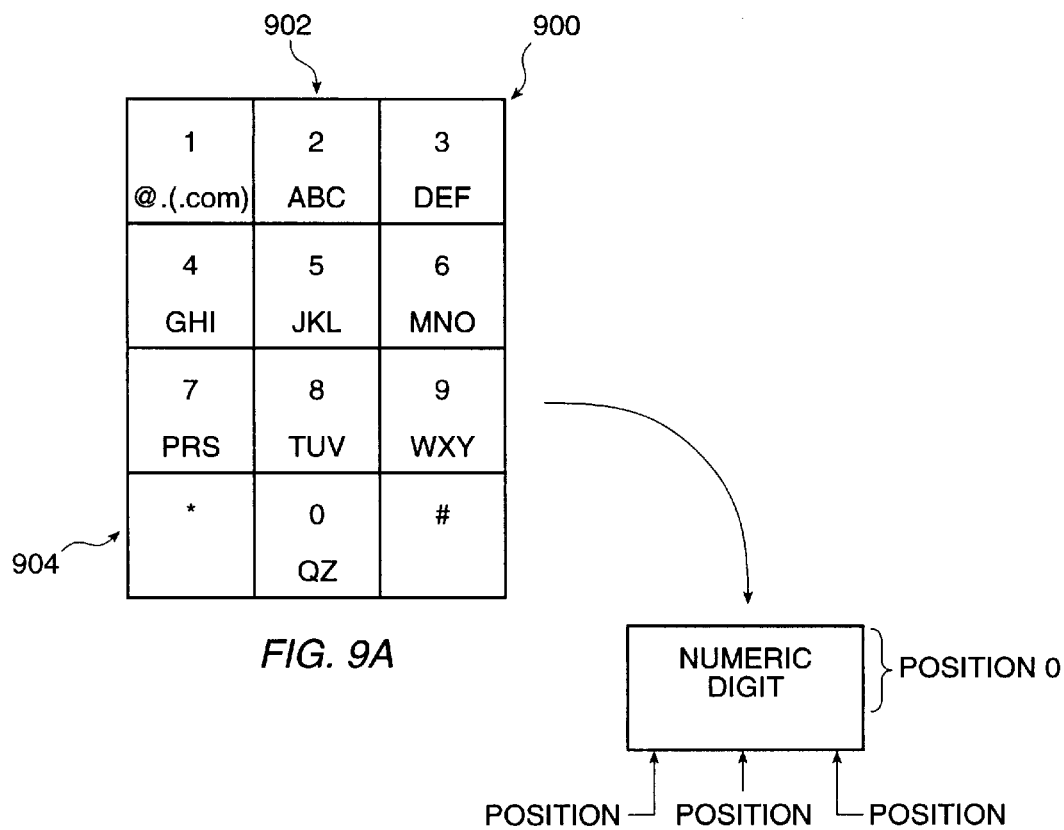
*FIG. 9A*
*FIG. 9B*
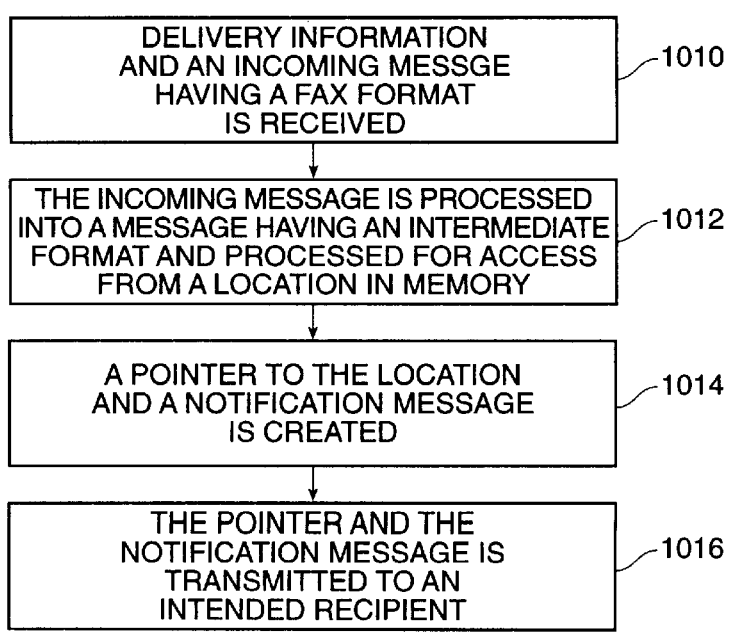
*FIG. 10*

APPARATUS AND METHOD FOR PROVIDING MULTIMEDIA MESSAGING BETWEEN DISPARATE MESSAGING PLATFORMS

BACKGROUND OF THE INVENTION

1. Field of the Invention

This invention relates to an apparatus and method for providing multimedia messaging between disparate messaging platforms. More particularly, the present invention pertains to a computer system that supports voice, fax, and electronic messaging between disparate messaging interfaces that transmit and receive messages on a variety of networks, including the Internet.

2. Description of the Related Art

Messaging systems that use a voice message format are known in the art. For example, the messaging system as illustrated in U.S. Pat. No. 5, 568,540 to Greco et. al., enables a user to receive messages having a voice mail format either through a telephone or through a personal computer coupled to a LAN. It also provides a graphical user interface ("GUI") on the personal computer to select which voice mail messages to receive and in what order.

However, the messaging system in Greco is a stand-alone system and consequently, cannot provide the advantages of linking to other similar messaging systems, and cannot provide the GUI feature to users not linked to the messaging system via the LAN, i.e., it is a closed messaging system. Thus, the recipient is limited to using the personal computer coupled to the messaging system's LAN if the recipient wishes to use the GUI feature provided by the messaging system. Recipients not connected to the LAN must use a telephone to obtain their messages and do not have the option of retrieving their voice mail messages by such commonly known means as the Internet such as through a personal computer running a web browser. Also, senders and recipients may incur long distance charges if they are not within the local area code of the messaging system phone number when accessing a voice mailbox through a telephone.

Another commonly used format in a messaging system is facsimile transmission and reception ("faxing"). As in voice mail messaging, faxing requires that both the sender and recipient have an apparatus capable of supporting a fax messaging format such as a fax machine or a computer with a fax modem. Fax messaging systems also may incur long distance charges if the receiving fax machine is not within a local area code although non-urgent transmissions may be time-shifted, i.e., the fax may be stored for transmission during off-peak hours, to obtain less costly transmission charges.

Email messaging is another commonly used format in a messaging system that has become almost as ubiquitous as the fax machine. As in the above types of messaging systems, email messaging requires both the sender and the recipient to have access to a common messaging medium, i.e, both must have access to an email account or a suitable network. Email messaging systems also typically do not provide for sending or receiving messages having either a fax or voice mail format. However, unlike in voice mail and faxing messaging systems, sending and receiving email messages usually only requires a dial-up connection to a local internet service provider (ISP) and thus, avoids long distance telephone line charges.

Accordingly, it would be desirable to provide an apparatus and method for integrating voice, fax, and email messaging between disparate messaging interfaces which employ different messaging formats and which use different networks between subscribers and non-subscribers through a switchable communications backbone such as the Internet.

SUMMARY OF THE INVENTION

The present invention is an apparatus and method for receiving a message having a first format and for converting the message from the first format to a second format that is compatible for reception by a messaging interface having a destination address corresponding to an intended recipient. In the preferred embodiment, a computer system is used to receive and send messages between messaging interfaces and networks which may be dissimilar from each other. A variety of network interfaces is used to communicate with the networks and which may optionally have a first interface and a second interface for interfacing to a first and second network, respectively. A receiving program or equivalent device receives an incoming message and delivery information from the first interface, where the incoming message has a message content format of a first type. A converter or equivalent device converts the incoming message having the message content format of a first type to a message having a message content format of a second type. The delivery information is used by the converter to determine the message content format of a second type for the message. A presenting program or similar device presents the message having the message content format of a second type to at least one recipient specified in the delivery information. The message content format of a second type includes a type where the message is stored in a location in memory and where the location in memory is pointed to by location information such as a universal resource locator.

The present invention may optionally have the following: a browser interface to control messages presented by the computer system on a real-time basis using hypertext commands; a recipient notification program or equivalent device that determines when a recipient is logged on to a network and if so, provides any messages stored in the recipient's mailbox to the recipient; a connection notification program or equivalent device that notifies the computer system that a recipient is logged on to a network so that the computer system can send to a recipient any messages stored in the recipient's mailbox; a message forwarding program or equivalent device that enables the computer system to forward messages to a second computer system via one of the networks used by the computer system; and an apparatus and method for sending and receiving a destination address including Internet addresses using a DTMF generator such as a standard telephone keypad.

BRIEF DESCRIPTION OF THE DRAWINGS

FIG. 9A is a diagram of a standard telephone keypad illustrating the preferred method of using the keypad to send Internet mail addresses in the presently preferred embodiment of the present invention.

FIG. 9B is a diagram of a standard telephone keypad button illustrating the preferred method of using the keypad to send Internet mail addresses in the presently preferred embodiment of the present invention.

FIG. 10 is a schematic block diagram showing the operation of a fax presented via web page messaging mode in a presently preferred embodiment of the present invention.

DESCRIPTION OF THE PREFERRED EMBODIMENTS

In the following description, a preferred embodiment of the invention is described with regard to preferred process steps and data structures. Those skilled in the art would recognize after perusal of this application that embodiments of the invention can be implemented using circuitry in a microprocessor adapted to the particular process steps and data structures, and that implementation of the process steps and data structures described herein would not require undue experimentation or further invention.

Figure 1:
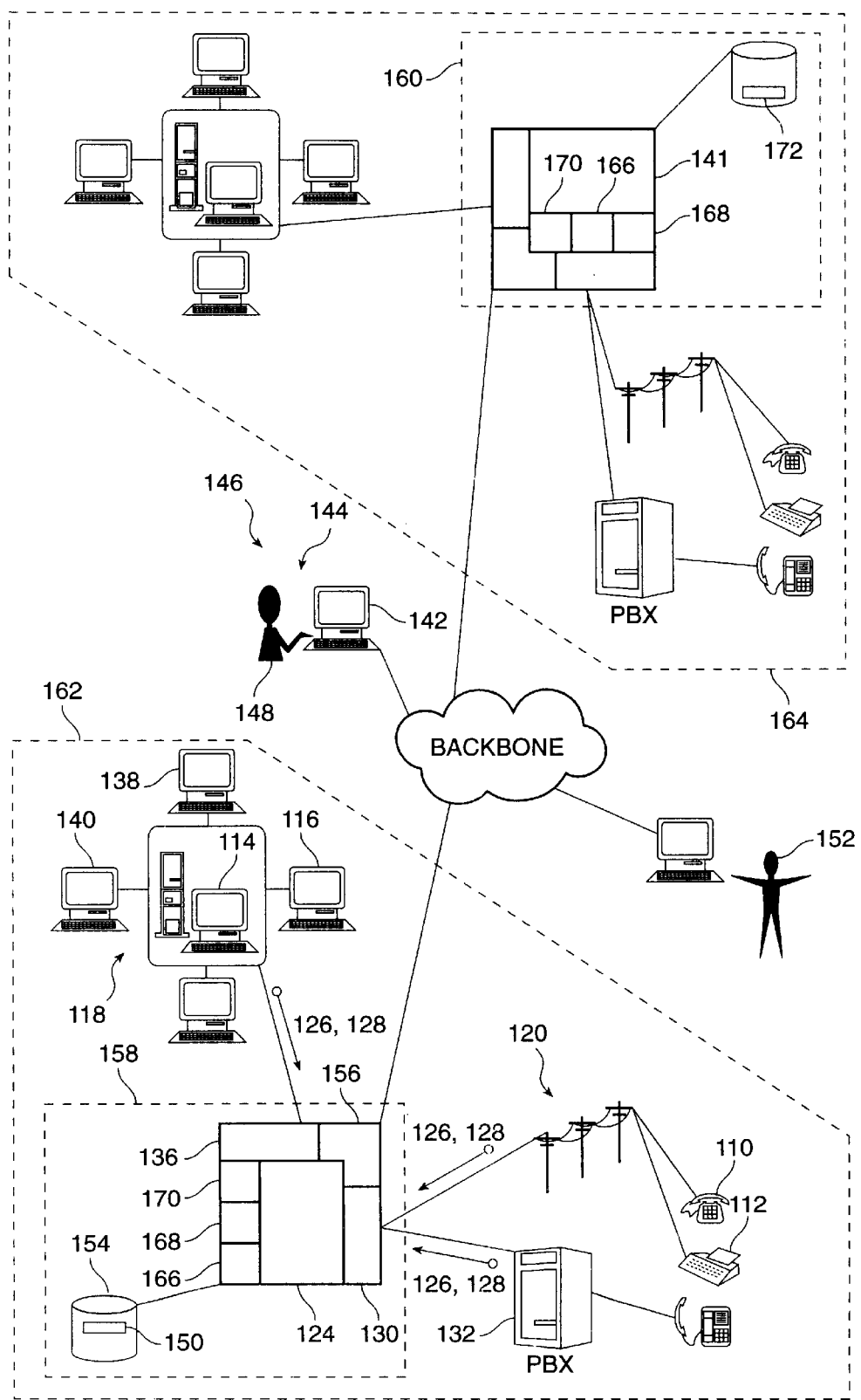
FIG. 1 is a schematic block diagram of a messaging system in a presently preferred embodiment of the present invention.

FIG. 1 is a schematic block diagram of a messaging system in a presently preferred embodiment of the present invention.

The present invention provides messaging between disparate messaging interfaces that may employ different messaging formats and that may use different networks. For example as shown in FIG. 1, the messaging interfaces may include a telephone 110, a fax machine 112, an email server 114, and/or a network terminal 116 such as a personal computer running a messaging application such as an email program or a browser program. The messaging interfaces may be coupled to different networks such as an area network 118, a telephone network 120, an intranet, or a switchable network such as the Internet 122. An area network 118 is defined as any network supporting distributed or centralized computing such as a local area network (LAN), a wide area network (WAN), or an intranet. An intranet is defined as a network that links more than one type of network such as a network that links a Novell network and a Windows NT network using an Internet protocol such as the TCP/IP protocol.

FIG. 1 also shows a server 124 or similar computing system that receives delivery information 126 and an incoming message 128 having a content format of a first type, converts the content format of a first type to a processed message having a content format of a second type using the delivery information, provides notification to an intended recipient using the delivery information, and presents the processed message having a content format of a second type to the intended recipient.

The server 124 provides the above by having a first network interface that can support the sending and receiving of messages and delivery information on a network. For example, the first network interface may be a telephone interface 130 which is linked to a first network such as telephone network 120. A telephone network 120 as used herein includes a public switch telephone network 120 (PSTN), central office (E1, T1, etc.), local private branch exchange (PBX) 132, cellular network, or any network that supports voice communication and destination addressing typically found in a standard telephone network. As generally known, a standard telephone network supports user terminals that typically include a telephone 110 and a fax machine 112. The telephone interface 130 is responsible for managing voice and facsimile communication such as answering incoming telephone calls as well as making outgoing calls through the telephone network 120.

The server 124 also has a second network interface that can support the sending and receiving of a message and delivery information on a network. For example, the second network interface may be an area network interface 136 that is linked to an area network and communicates with an area network server such as email server 114 which is connected to the area network. This permits the server 124 via the area network interface 136 to send and receive email messages from the email server 114 or from area network clients such as personal computers 138 and workstations 140 which typically provide messaging capabilities and graphical user interfaces ("GUI"), as known in the art. The area network interface 136 can also be configured to provide the functions of the email server 114.

A sender or a recipient may either be a subscriber or non-subscriber and has the option of using any one of the following types of messaging interfaces such as a telephone 110, fax machine 112, email messaging program, or a web browser program. The messaging interfaces may be linked to a telephone network 120, an area network 118, a remote server 141, or directly to the Internet 122 through an internet service provider (ISP) using a personal computer 142 having a messaging interface such as a voice, fax, email program 144 or web browser program 146.

It is presently contemplated that the present invention is not limited to the above types of telecommunications networks but has a scalable and modular design that can be modified to support other types of networks, e.g., a direct broadcast or satellite network, having the capability to send message types that include voice, fax, and email data simply by adding another network interface to the server that can support the additional network. For example, an intranet network interface may be added to the server, where the intranet network interface supports the sending and reception of messages on an intranet. The above messaging types is illustrative only and is not intended to limit the invention in any way. For example, since the present invention has a scalable and modular design it can be modified to include a network interface that can support the reception and transmission of messages having a video format.

A subscriber 148 is defined as a messaging user who has a "mailbox" 150 allocated in server 124. A non-subscriber 152 is a messaging user who does not have a mailbox allocated in server 124 but may still send and receive messages which are limited to certain message types.

The server 124 also includes a memory 154 that includes user mailbox 150. It is contemplated that the user mailbox 150 contain subscriber information such as subscriber IDs and a portion of memory that is allocated for the storage of messages that are intended for each subscriber listed in the user mailbox. User mailbox 150 can be linked directly to server 124 as shown in FIG. 1 or can be made accessible through a network. Similarly, each network interface used by the server such as the telephone interface and the LAN interface can be integrated with the server in one stand-alone system as shown in FIG. 1, or as physically separate systems integrated together by LAN.

Since the server 124 is scalable, it may also include a third network interface that supports the sending and receiving of messages on a switchable network. For example, the third network interface may be an internet interface 156 for supporting the sending and receiving of messages on the Internet 122, creating a local server node 158. It is presently contemplated that a group of servers may be linked together using the switchable network as a communications backbone to support messaging users within an area that is supported by each server although only local server node 158 and one remote server node 160 are shown to avoid over-complicating FIG. 1.

Since the Internet 122 serves as a switchable communications network that spans the entire globe, this permits the advantage of avoiding long distance charges that are typically encountered when using telephone networks to send messages across large geographical distances, e.g., international phone calls and faxes, while also enjoying the ability to send messages of various types through a unified addressing scheme such as the Domain Name System (DNS) commonly employed on the Internet. As presently contemplated, the local server node 158 and remote server node 160 communicate with each other using the commonly known TCP/IP protocol although the use of this protocol is not intended to be limiting in any way and may be any transmission protocol suitable for connecting a group of servers.

For example, servers are installed in major cities and economic zones to support subscribers in the vicinity with each installation acting as a node on the Internet. Each subscriber will be allocated memory space ("mailbox") in the local server node, and is uniquely identified under the DNS scheme of the Internet. A particular server node in San Francisco can be identified as "sf_cp.com", where sf_cp.com is the domain name of the server, corresponding to its unique IP address. Subscribers can be identified as <user-name>@sf_cp.com or <mailbox-id>@sf_cp.com. The variables, <user-name> and <mailbox-id> are the unique user name and mailbox ID assigned to a subscriber who is a member of a particular server node. Thus, every subscriber will have a globally unique unified mail (u-mail) address corresponding to a universal mailbox in the server.

In this embodiment the internet network interface 156 enables the server to use the Internet 122 as a conduit to send or receive messages by supporting a variety of messaging interfaces that are typically used to send or receive messages on the Internet 122. Using FIG. 1 as an example, the internet network interface 156 supports the sending and receiving of fax, email, and voice message types between subscribers and non-subscribers either within a local area 162 supported by a local server, e.g., local server node 158 or within a non-local area 164 supported by a remote server, e.g., remote server node 160, or directly to an intended targeted recipient 148 who can receive messages directly from the Internet 122. It is presently contemplated that the delivery information includes the recipient's destination address and the delivery format of the message.

It is presently contemplated that each server within a group of linked servers such as local server 124 and remote server 141, employ a routing table 166 and routing program 168, enabling each server to determine whether a destination address is within local area 162 or within non-local area 164.

Specifically, the routing program 168 uses the routing table 166 and the destination address to determine which server within the group of linked servers is best suited for message delivery in an area corresponding to the destination address. In the preferred embodiment of the present invention, one criteria used by the routing program 168 to determine whether a server is best suited for message delivery is whether that server can deliver the message or enable an intended recipient to obtain the message from the server without or with a reduced network access charge such as a long distance access charge typically encountered when using a telephone network to call a location in a different area code.

Also, it is presently contemplated that one server within the group of servers is designated as the master server for maintaining the routing tables in each server. Each time a new server is added to the group of servers, the master server updates the routing tables in each server reflecting the addition of the new server.

Each server may also provide a forwarding feature that enables a subscriber to have messages stored in one server forwarded to a another server. This forwarding feature has two versions, a virtual mailbox version and a roaming mailbox version, and is provided by a forwarding program 170 or equivalent included within each server. The subscriber may elect to establish a roaming or virtual mailbox simply by calling the server in which the subscriber is a member, choosing a menu option for establishing a roaming or virtual mailbox, and entering the server number from which the roaming or virtual mailbox is to be established. The server number is a unique number allocated for each server within a group of servers that are configured to provide messaging services as presently contemplated in the present invention.

To provide for the virtual mailbox version, the forwarding program forwards all messages stored in a temporary mailbox 172 to the subscriber's mailbox that is located within a server node in which the subscriber is a member such as local server node 158, in FIG. 1. The temporary mailbox 172 is located in a server chosen by the subscriber using a server number that uniquely corresponds to that server. Typically, the server supports an area such as non-local area 164, where a subscriber wishes to obtain messages using local networks but where the subscriber is not a member of the server that supports the area.

The forwarding program 170 provides for a roaming mailbox in a similar manner, except messages are forwarded from the subscriber's universal mailbox 150 to a temporary mailbox 172 created within a server that supports an area where a subscriber wishes to obtain messages such as non-local area 164 ("roaming area"). Again as in the virtual mailbox version, temporary mailbox 172 is part of remote server node 160 which is chosen by the subscriber using a server number that uniquely corresponds server node 160. Roaming area 164 is typically outside an area supported by a server in which the subscriber is a member such as local server node 158 and thus, is reached through the use of remote server node 160.

Figure 2:
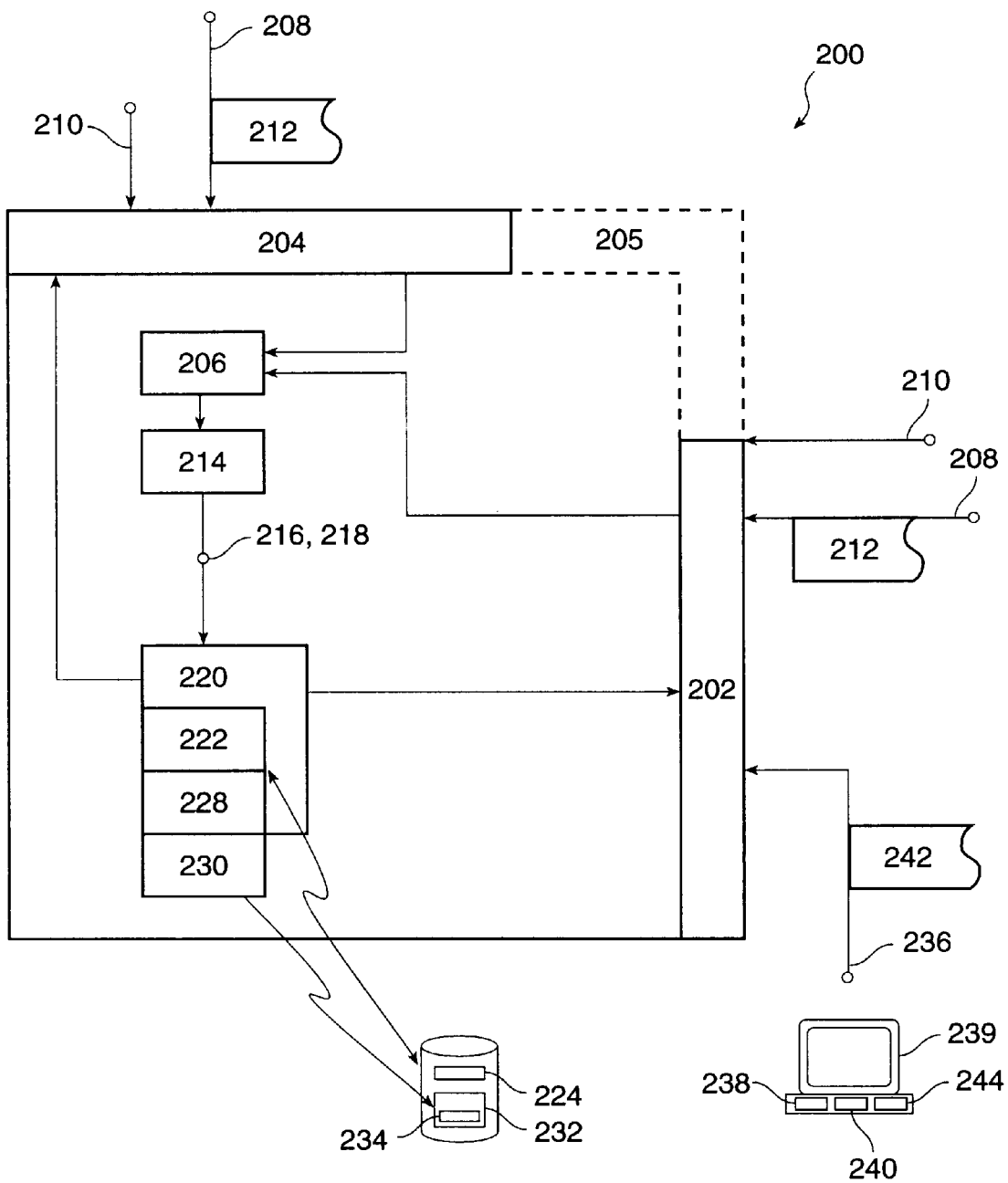
FIG. 2 is a schematic block diagram of a messaging server in a presently preferred embodiment of the present invention.

FIG. 2 is a block diagram of a messaging server 200 as presently preferred in the present invention.

The server 200 includes a first network interface 202 and a second network interface 204 for sending and receiving messages. The present invention is not intended to be limited to first network interface 202 and second network interface 204 but may be modified to support additional network interfaces 205 to support the sending and receiving of messages on additional networks. However, in order to avoid over-complicating FIG. 2, only first network interface 202 and second network interface 204 are shown.

FIG. 2 also shows a program 206 or equivalent device for receiving an incoming message 208 and delivery information 210 from any network interface available in the server 200 such as through first network interface 202 or through second network interface 204. The incoming message 208 has a message content format of a first type 212 such as a fax, email, or voice format. Note that an email format also includes messages having formats that may be sent via email such as digitized audio, graphics files, and digitized video.

Also shown is a conversion program 214 or equivalent device ("converter") for converting the incoming message 208 having the message content format of a first type 212 to a message 216 having a message content format of a second type 218 ("delivery format"). The converter 214 determines the delivery format 218 according to received delivery information 210.

In addition, a presentation program 220 or equivalent device delivers the message 216 having delivery format 218 to at least one recipient having a messaging interface coupled to a network supported by either first network interface 202 or second network 204. The delivery information specifies the destination of the intended recipient. The presentation program 220 includes a web page generator 222 that provides a delivery format in the form of a web page by storing the incoming message 208 in a location 224 such as a subscriber mailbox in a subscriber mailbox database or any equivalent means such as a memory. The presentation program 220 also includes a message notification program 228 or equivalent device which generates message notification to a recipient specified in the delivery information.

Also, the message notification program 228 is responsive to a connection made to at least one of the networks by a subscriber in which the server is coupled such as the Internet. Specifically, message notification program 228 includes a polling program 230 or equivalent device and a table 232 of network address information 234 such as a permanent internet protocol address. Each network address information 234 stored in table 232 corresponds to a subscriber that is a member of the server in which table 232 is stored. Polling program 230 uses network address information 234 to poll for a subscriber connection, if a message is waiting in the subscriber's universal mailbox. For example, a PING program may be used to poll for a subscriber connection using the permanent internet protocol address. For each subscriber connection found, message notification program 228 generates a message waiting message for transmission to the subscriber.

Message notification program 228 is also responsive to a subscriber connection signal 236 sent by a connection notification program 238 or equivalent. As presently contemplated, connection notification program 238 is a background program running on a computing platform that is used for messaging purposes such as a personal computer 239 running a browser or email program. As known in the art, such background programs are known as terminate and stay resident programs. Connection notification program 238 scans for a network connection made by the computing platform.

When a connection is made, a sending program 240 or equivalent device includes network address information 242 with the subscriber connection signal 236. The network address information is created in response to the connection made by the computing platform or equivalent messaging interface to a network. The network connection may be a connection made to the Internet which results in network address information provided for that connection such as an internet protocol address.

As known in the art, an internet protocol address may or may not be permanently assigned to a messaging interface such as the computing platform discussed immediately above. A permanent internet protocol address is defined for a specific connection made on the Internet and becomes active at the time the connection is made by a messaging interface. Since a permanent internet protocol address does not change for a given internet connection, it is sometimes configured into the messaging interface, thereby avoiding the need to receive the address from an ISP for each connection. A temporary or dynamically assigned internet protocol address is generated at the time a connection is made. Consequently, the present invention includes a program 244 or equivalent device for receiving an internet protocol address at the time a connection is made to the Internet.

The web page provides command menu options for viewing the message over a suitable network such as the Internet by an intended recipient having a messaging interface such as a web browser. It is presently contemplated that the command menu options provided in the web page are implemented using hyperlink. A message having a digitized audio message is retrieved by initiating a "play" command on the web page, resulting in the web browser sending a URL corresponding to the server containing the web page followed by "/play". Similarly initiating a "pause" or "reverse" command on the web page results in the web browser sending a URL corresponding to the server containing the web page followed by "/pause" or "/reverse", respectively.

For example, a web page having a digitized audio message for a subscriber having the name "john doe" stored in a server having a u-mail address of "sf_cp.com" would result in a URL corresponding to the server that has the following construction, "http://sf_cp.com/jdoe". Thus a "play" command would result in the following hyperlink command being sent by the web browser to the server, "http:H/sf_cp.com/jdoe/play".

This method of passing commands from the web browser using hyperlinks commands can be easily expanded to pass commands for accessing other types of messages as well, not just digitized audio. For example, digitized video may also be accessed simply by providing hyperlink commands that include a URL that points to the applicable programs that provide viewing control such as "play", "pause", "stop", "reverse", and "forward".

In addition, with respect to fax messaging, this embodiment of the present invention avoids having to send a large fax message as an email attachment over the Internet at one time, but permits the intended recipient to use a browser to view the message a portion at a time from the web page located on the subscriber's server.

INTERNET FAX MESSAGING SERVICES

As presently contemplated, the present invention supports the following types of fax messaging from subscribers to non-subscribers: 1) fax message to fax message; 2) fax message within an email message to fax message; 3) fax to email message; 4) fax to web page. The present invention also supports fax messaging from non-subscribers sending to subscribers.

A subscriber sending a fax using a fax machine to a non-subscriber has the option of having the fax message received as a fax, as an email, or as a web page, while subscribers wishing to forego using a fax machine can compose an email and still have the email message received by an intended recipient as a fax, as an email or as a web page.

Fax to Fax (Subscribers to Non-Subscribers)

Figure 3:
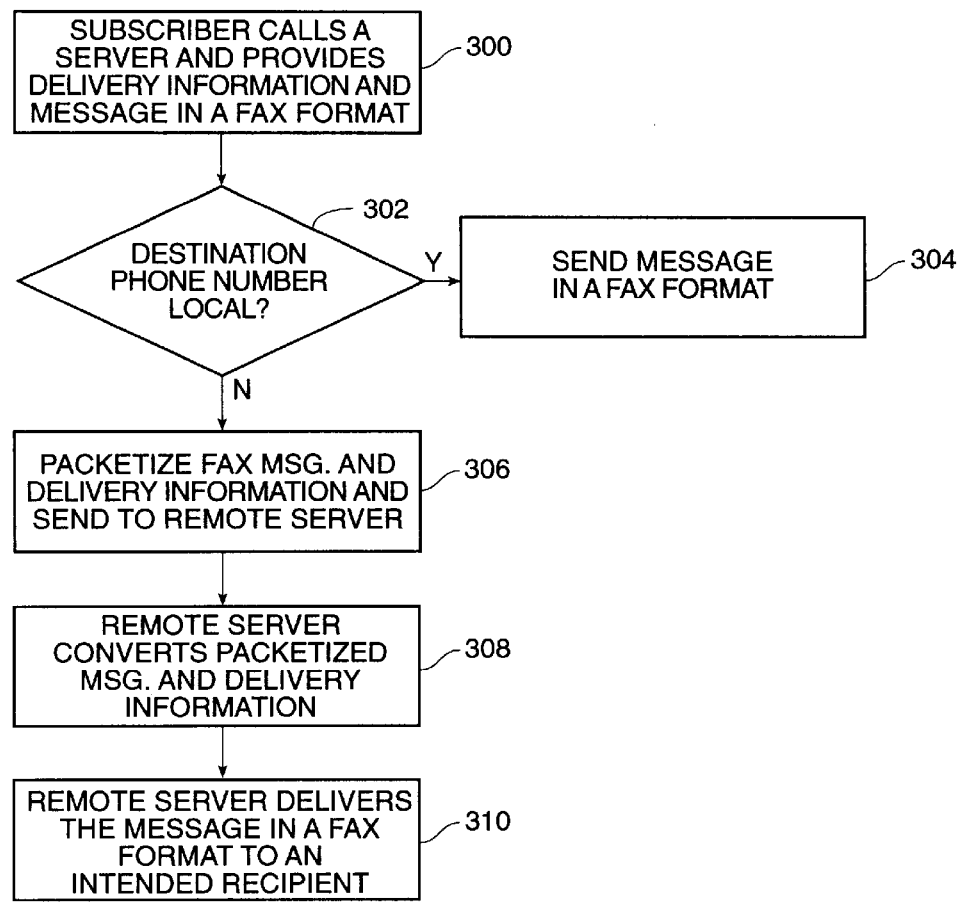
FIG. 3 is a schematic block diagram showing the operation of a fax to fax messaging mode in a presently preferred embodiment of the present invention.

FIG. 3 is a schematic block diagram showing the operation of a fax to fax messaging mode in a presently preferred embodiment of the present invention.

Figure 4:
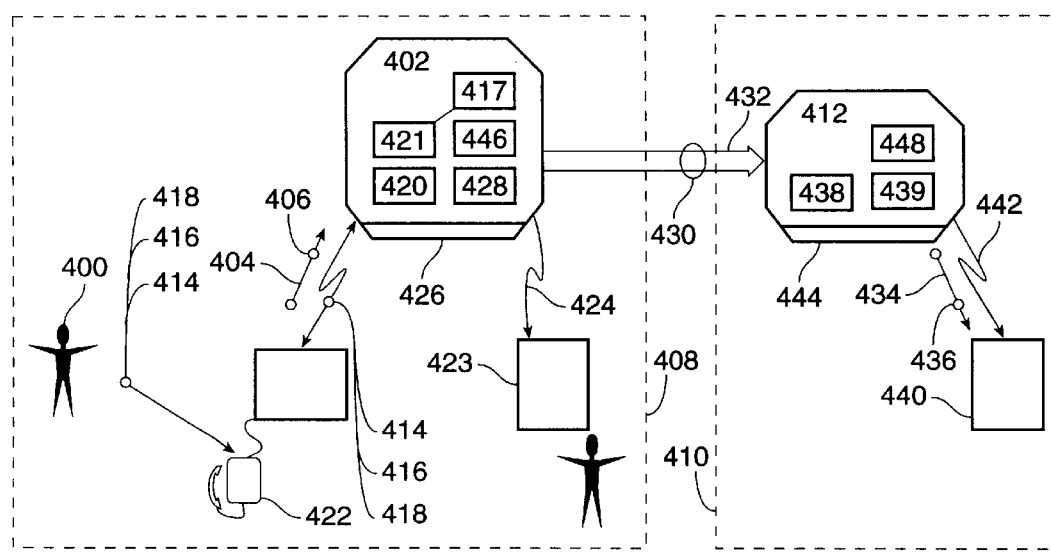
FIG. 4 is a schematic block diagram illustrating the use of messaging servers during the operation of a fax to fax messaging mode in a presently preferred embodiment of the present invention.

FIG. 4 is a schematic block diagram illustrating the use of messaging servers during the operation of a fax to fax messaging mode in a presently preferred embodiment of the present invention.

Referring now to FIGS. 3 and 4, a subscriber seeking to have the fax message received by an intended recipient as a fax would perform the following steps.

At step 300, a subscriber 400 calls a local server 402 and when prompted by local server 402 chooses the option of having the incoming message 404 received as a message having a fax message delivery format 406 within an area 408 supported by local server 402 or within an area 410 supported by a remote server 412. Local server 402 prompts subscriber 400 for an subscriber ID 414, password 416, and delivery information 418 such as the telephone number of an intended recipient's fax device. A program 420 included with local server 402 determines subscriber ID 414, password 416, and delivery information 418 such as a telephone number as transmitted by the subscriber through a DTMF generator such as a standard telephone keypad 422. Upon receiving the required information, local server 402 generates a start signal such as a CNG tone, signaling subscriber 400 to initiate the transmission of the fax message, e.g., by pressing a START button on the fax machine.

At step 302, upon completion of the fax transmission local server 402 processes the incoming message 404 by using a routing program 417 and routing table 421 to determine whether the destination telephone number 418 is within a local area 408 supported by local server 402, or within a non-local area 410 supported by remote server 412.

If the destination phone number is local telephone number, step 304 is performed. At step 304 the local server simply routes the fax message to the intended recipient's fax device 423 through a telephone network 424 linked to local server 402 via telephone network interface 426 using destination phone number 418. Otherwise, if the destination phone number corresponds to an area served by remote server 412, step 306 is performed.

At step 306, local server 402 using an encapsulation program 428 converts the fax message and delivery information into data packets 430 and routes the packets to remote server 412 via a network such as the Internet 432.

At step 308, remote server 412 converts the data packets to a message 434 having a delivery format of a fax message and delivery information 436 using a de-encapsulation program 438.

At step 310, remote server 412 uses a presentation program 439 to transmit message 434 having a delivery format 436 of a fax message to the intended recipient's fax device 440 through a telephone network 442 linked to the telephone interface 444 provided within remote server 412.

The term data packet or packet is used to define a unit of data sent across the Internet or suitable network. The packets as presently contemplated includes a message data portion and a header portion, where the header portion includes origination, destination, message type information.

Since fax messages are sent via the Internet 432 through local server 402 and remote server 412, long distance toll charges are avoided or significantly reduced if the fax messages were otherwise sent through long distance phone lines. Any toll charges incurred by local server 402 or remote server 412 are tracked and charged to the subscriber's account using accounting program 446 and 448, respectively. The sending and receiving of the fax document are both done from a standard fax machine, the same way a fax is normally sent without the need to have an Internet account. The dialing of the local server telephone number and user ID can be simplified by programming into speed dialing or using an automatic dialer.

Fax Sent via Email

Figure 5:
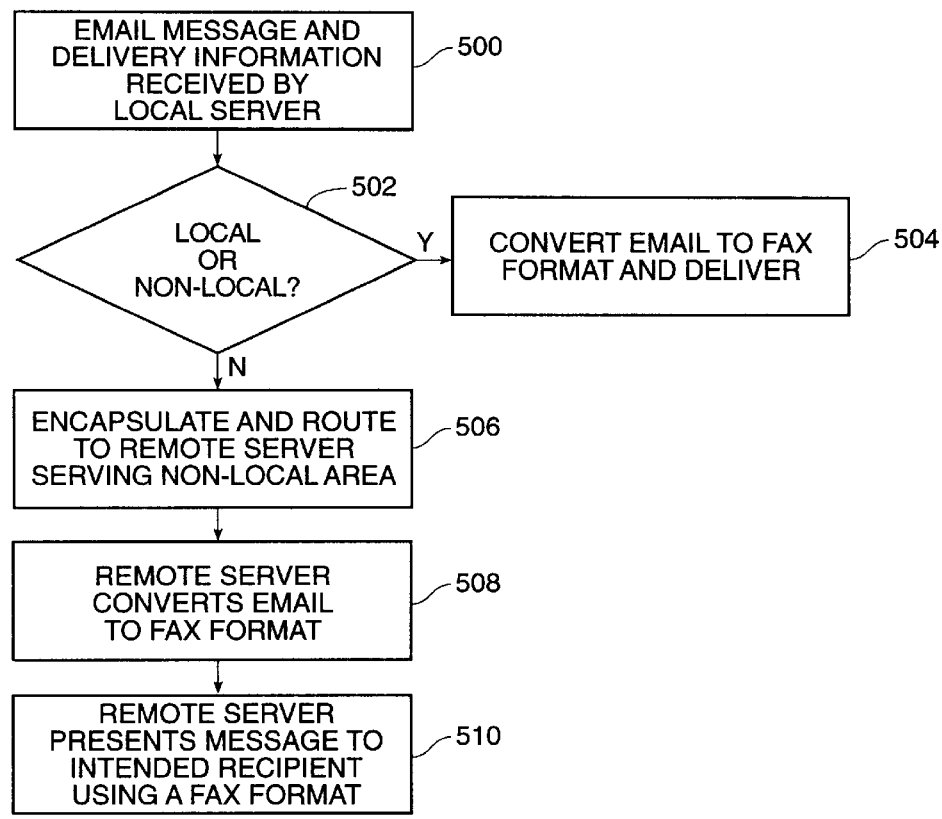
FIG. 5 is a schematic block diagram showing the operation of a fax sent via email messaging mode in a presently preferred embodiment of the present invention.

FIG. 5 is a schematic block diagram showing the operation of a fax sent via email messaging mode in a presently preferred embodiment of the present invention.

Figure 6:
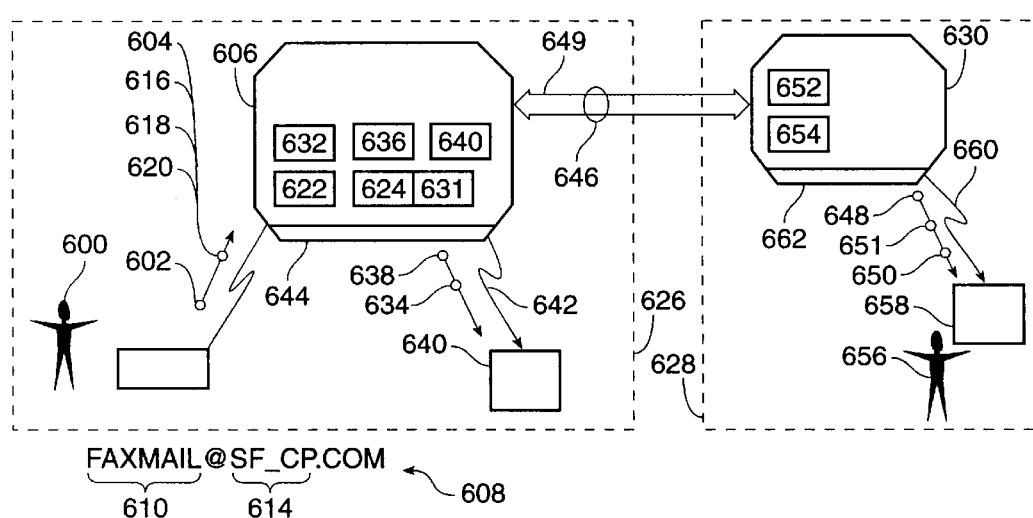
FIG. 6 is a schematic block diagram illustrating the use of messaging servers during the operation of a fax sent via email messaging mode in a presently preferred embodiment of the present invention.

FIG. 6 is a schematic block diagram illustrating the use of messaging servers during the operation of a fax sent via email messaging mode in a presently preferred embodiment of the present invention.

Referring now to FIGS. 5 and 6, a subscriber also has the option of having an email message received by an intended recipient, who is a non-subscriber, in a fax format. It is contemplated that the subscriber has an email account which is used to send the message as an email message or as an attachment to an email message.

At step 500, a subscriber 600 sends an incoming message 602 having an email format 604 to local server 606 using an email addressing convention 608 as discussed above, e.g., "faxmail@sf_cp.com", where the "faxmail" portion 610 provides delivery information by signifying that the email should be transmitted to an intended recipient as a message having a fax format. The "sf_cp" portion 614 indicates the server location that is intended to receive the incoming message 602, which would be in this example a server located in San Francisco. Incoming message 602 includes the destination address, i.e., a telephone number 616, of an intended recipient's fax device, a password 618 of the subscriber, and the sender's email address 620. Upon receipt of the incoming message 602, a validating program 622 included within local server 606 processes the message by validating the subscriber's identity by checking the included password 618 against the sender's email address 620.

At step 502, a routing program 624 determines whether destination phone number 616 is within a local area 626 supported by local server 606; or within a non-local area 628 supported by a remote server 630 by using a routing table 631.

If destination phone number 616 is a telephone number served by local area 626, step 504 is performed. At step 504, local server 606 has an email processing program 632 that extracts the message contents of the email or email attachment and converts the message contents into a delivery format that includes a fax format 634 which is suitable for reception by a standard fax device such as a fax machine or fax modem. A presentation program 636 delivers the message 638 having the fax format 634 to a fax device 640 corresponding to the destination phone number 616 through local telephone network 642 via a telephone network interface 644.

Otherwise, if routing program 624 determines that destination phone number 616 falls within non-local area 628, step 506 is performed.

At step 506, local server 606 using an encapsulation program 640 converts the email into data packets 646 and routes the packets 646 to remote server 630 via a network such as the Internet 649.

At step 508, remote server 630 converts the data packets 646 to a message 648 having a delivery format of a fax message 651 and delivery information 650 using a de-encapsulation program 652.

At step 510, remote server 630 uses a presentation program 654 to transmit the message 648 having delivery format of a fax message 651 to an intended recipient 656 by using destination phone number 616, which is obtained from delivery information 650, to reach the recipient's fax device 658 through telephone network 660 via telephone network interface 662

In this preferred embodiment of the present invention, the server network provides the subscribers the convenience of using their familiar email client programs and PC applications for sending fax to non-subscribers who do not have an email account, while avoiding or reducing long distance toll charges.

Fax Received as Email

Figure 7:
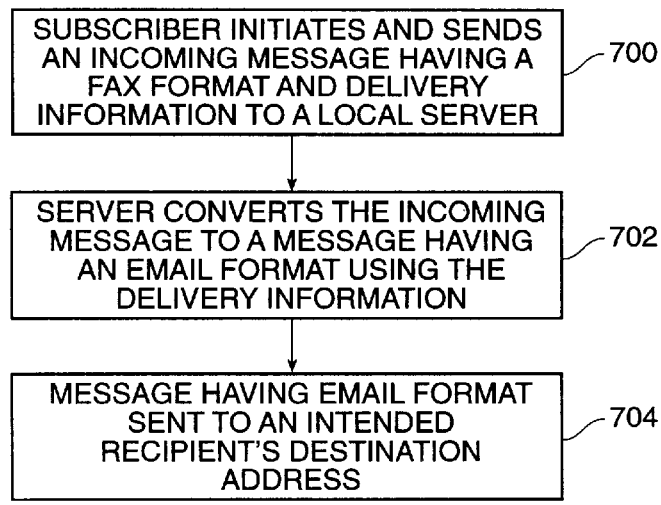
FIG. 7 is a schematic block diagram showing the operation of a fax received as email messaging mode in a presently preferred embodiment of the present invention.

FIG. 7 is a schematic block diagram showing the operation of a fax received as email messaging mode in a presently preferred embodiment of the present invention.

Figure 8:
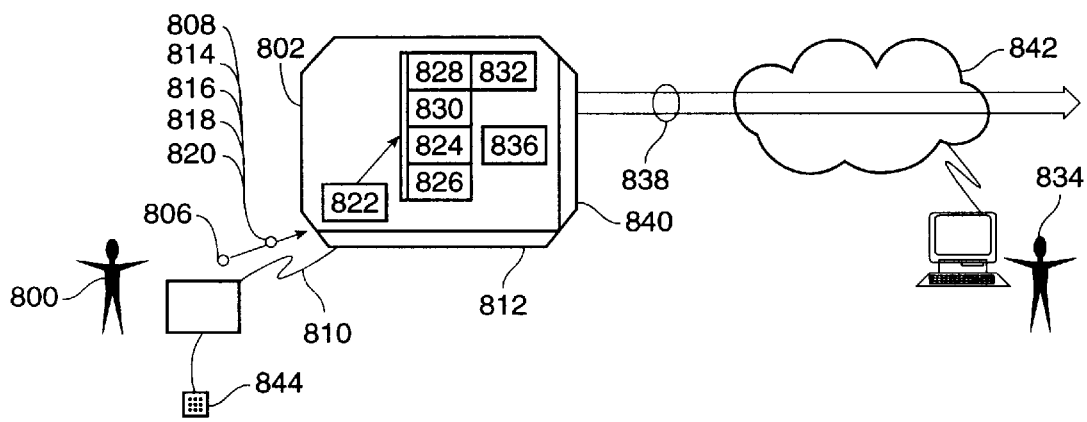
FIG. 8 is a schematic block diagram illustrating the use of messaging servers during the operation of a fax received as email messaging mode in a presently preferred embodiment of the present invention.

FIG. 8 is a schematic block diagram illustrating the use of messaging servers during the operation of a fax received as email messaging mode in a presently preferred embodiment of the present invention.

Referring now to FIGS. 7 and 8, a subscriber can also send a fax message to a non-subscriber where the non-subscriber as intended recipient receives the fax message as an attachment in the form of an email message. This permits a subscriber to send a fax document to a non-subscriber who does not have a means for receiving a fax but has access to an email account.

At step 700, a subscriber 800 calls a local server 802 to initiate sending via a fax device 804 an incoming message 806 having a fax format 808 to local server 802 using a telephone network 810 linked to a telephone network interface 812. Local server 802 responds by prompting the subscriber 800 for an ID, password, and delivery information. The subscriber enters an ID 814, password 816, and delivery information 818 such as an email address 820 of an intended recipient. Upon receiving the required information, the local server 802 generates a CNG tone or similar signal which signals the subscriber to initiate the fax transmission. The local server 802 receives the message 806 having a fax format 808 through telephone network 810 via telephone network interface 812.

At step 702, upon completion of the fax transmission the local server 802 processes the incoming message 806 having a fax format 808 according to delivery information 818 by using a fax to email conversion program 822 or equivalent device to convert the incoming message 806 having a fax format 808 to a message 824 having a graphics format 826 such as a BMP format. The fax to email conversion program 822 uses the delivery information 818 to create a message 828 having an email format 830 that includes the message 824 having a graphics format 826 as an attachment. Also, the fax to email conversion program 822 uses the delivery information 818 to provide a destination address 832 for message 828 such as an email address of an intended recipient 834.

At step 704, local server 802 using an encapsulation program 836 or equivalent converts the message 828 having an email format 830 and delivery information 818 into data packets 838 and routes the data packets via an applicable network interface such as an Internet interface 840 for delivery to intended recipient 834 via the Internet 842. The present invention is not intended in any way to be limited to an email address but may include other types of destination addresses that are applicable to the data network used to send data packets 838.

In a preferred embodiment of the present invention, entry of the intended recipient's email address 820 is achieved through the use of a standard telephone keypad 844 or any type of device that generates DTMF signals similar to that of the standard telephone keypad. Telephone network interface 812 receives and decodes the DTMF signals to determine which buttons on the telephone keypad were depressed, deciphering the intended recipient's email address.

FIG. 9A is a diagram of a standard telephone keypad illustrating the preferred method of using the keypad to send Internet mail addresses in the presently preferred embodiment of the present invention.

As seen in FIG. 9A, a typical telephone keypad 900 has twelve buttons with ten of the twelve buttons numbered one ("1") through nine ("9"), inclusive, with the number zero ("0") at the intersection of the second column 902 and bottom row 904 of the keypad. In the preferred embodiment of the present invention, the buttons two ("2") through 9 and 0 provide for all of the letters in the english alphabet, while the button 1 is used to provide the symbols "@", ".", and ".com".

FIG. 9B is a diagram of a standard telephone keypad button illustrating the preferred method of using the keypad to send Internet mail addresses in the presently preferred embodiment of the present invention.

To specify a specific character the user depresses a button on the keypad that has the desired symbol followed by another button corresponding to the position of the symbol. As shown in FIG. 9B, there are four possible positions, 0 through 3. Position 0 designates the previous entry as a number corresponding to the button depressed, while positions 1–3 designate the first, second, and third alpha characters, respectively, on the button previously depressed. For example, to enter "jdoe@eng3.xyz.com", the user will enter the following keystroke sequence: "51 31 63 32 11 32 62 41 30 12 92 93 02 13".

Fax Presented Via Web Page

FIG. 10 is a schematic block diagram showing the operation of a fax presented via web page messaging mode in a presently preferred embodiment of the present invention.

Figure 11:
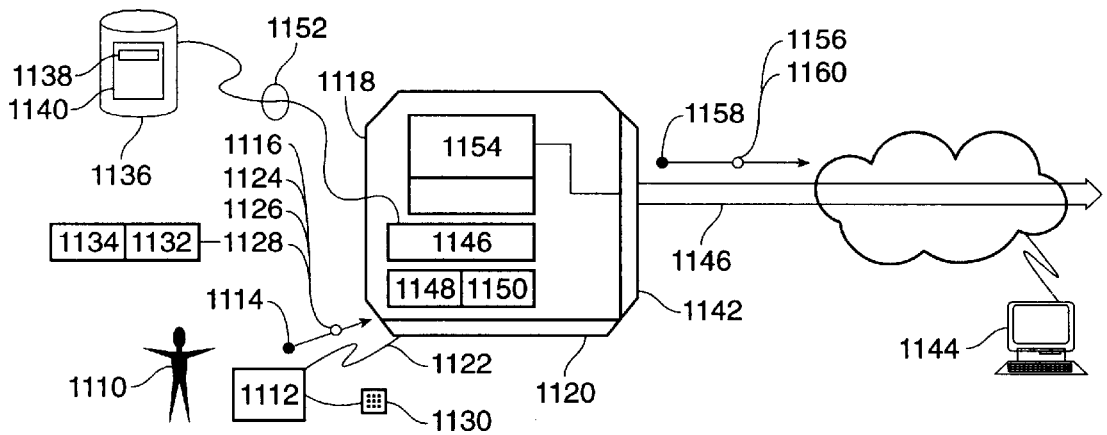
FIG. 11 is a schematic block diagram illustrating the use of messaging servers during the operation of a fax presented via web page messaging mode in a presently preferred embodiment of the present invention.

FIG. 11 is a schematic block diagram illustrating the use of messaging servers during the operation of a fax presented via web page messaging mode in a presently preferred embodiment of the present invention.

Referring now to FIGS. 10 and 11, the present invention as presently contemplated enables a subscriber to send a message having a fax format to a non-subscriber in a format where the message is stored and made available for viewing by the non-subscriber through a messaging interface such as a web browser.

At step 1010, a subscriber 1110 uses a fax device such as a fax machine 1112 to send an incoming message 1114 having a fax format 1116 to local server 1118 via a telephone interface 1120 through a local telephone network 1122. Local server 1118 responds by prompting the subscriber for an ID 1124, password 1126, and delivery information 1128 which may be entered via a telephone keypad 1130 or a similar type of device such as a DTMF generator, in a manner as previously described above. The server 1118 generates a CNG tone or similar signal which signals the subscriber to initiate a fax transmission.

The delivery information 1128 in this messaging mode includes a destination address corresponding to an intended recipient such as an email address 1132 and a delivery format 1134. The delivery format 1134 in this messaging mode is a format type that includes storing incoming message 1114 in a memory 1136. For example, the incoming message 1114 may be stored in a subscriber's mailbox 1138 in a subscriber mailbox database 1140 so that it is accessible via a network interface 1142 by a messaging interface such as a web browser 1144. The network interface 1142 is coupled to a suitable network that is linked to messaging interfaces that supports the use of a web browser such as the Internet 1146.

At step 1012 upon completion of the fax transmission, local server 1118 processes the incoming message 1114 having a fax format 1116 according to delivery information 1128 by converting incoming message 1114 having fax format 1116 to a message 1148 having an intermediate format 1150 such as graphic format, e.g., a JPEG or BMP graphic format.

A presentation program 1146 or equivalent device converts the message 1148 having the intermediate format 1150 to a delivery format 1152 by storing message 1148 having intermediate format 1150 in memory location 1136. For example, the presentation program 1146 creates a web page that includes the message and stores the web page in subscriber's mailbox 1138.

At step 1014, a notification program 1154 or equivalent device creates a pointer 1156 to the location of the message 1138 and a notification message 1158 having the intended recipient's destination address 1160 such as an email message having email address. The destination address is obtained from delivery information 1128.

At step 1016, the notification program 1154 transmits the notification message to the intended recipient using a suitable network interface such as network interface 1142.

In the presently preferred embodiment of the present invention, the pointer 1156 is a universal resource locator (URL) that points to the message included in the web page. The URL is included within an HTML file which is included with the notification message 1158 as an attachment file. This permits an intended recipient to access the message presented in the web page simply by launching the email attachment file with a messaging interface that provides a web browser.

Fax Messaging (Non-subscriber to Subscriber)

The present invention as presently contemplated also permits a non-subscriber to send a fax message to a subscriber. A non-subscriber dials a telephone number of the server where the targeted subscriber is a member using a fax device such as a fax machine. The server answers the call and prompts the sending non-subscriber to enter the targeted subscriber's mailbox ID, and to initiate fax transmission. The server processes the fax message by converting the fax message into a format suitable for storing into the intended subscriber's mailbox for later retrieval such as a BMP or JPEG graphics file.

Roaming or Virtual Mailbox

In an alternative embodiment of the present invention, the subscriber may configure his subscriber mailbox to forward or receive messages from a roaming or virtual mailbox, respectively, as described above. The subscriber can retrieve fax messages from either the subscriber mailbox or from the roaming or virtual mailboxes as desired. The forwarding of the fax messages between mailboxes is done through the Internet and thus, avoids incurring long distance toll charges. Thus, the subscriber can publish the local server telephone number to non-subscribers in a geographical area who have a need to send fax to the subscriber without having the callers incur a long distance toll charge.

For example, a subscriber conducting business in a foreign country may establish a virtual mailbox in a server supporting a geographical location within the foreign country and use the telephone number of the server and the virtual mailbox number as the fax line for doing business in that country. For subscribers that have significant amount of fax communication, they can have a specific telephone line to the server dedicated for their sole use, use direct inward dialing (DID), or use a Dialed Number Identification Service (DNIS), thus avoiding the need for non-subscribers to enter the intended recipient subscriber's virtual mailbox number when the non-subscribers call in to leave a fax message.

The roaming mailbox feature forwards fax messages from a server in which the subscriber has a subscriber mailbox to another server having a roaming mailbox chosen by the subscriber. In this embodiment of the present invention, the server in which the subscriber is a member is configured to forward fax messages via a network such as the Internet. Typically, a server chosen by the subscriber supports a geographical area that the subscriber anticipates visiting. By having messages forwarded to the server supporting the area visited by the subscriber, the subscriber may receive messages that were originally destined for the server in which he is a member from a server that supports a geographical area that covers or that is more suited in terms of proximity to an area the subscriber is visiting.

For example, a subscriber may be a member of a server located in San Francisco but wants to perform business in the short term in Hong Kong. By configuring the member server to forward all of the subscriber's messages to a server that supports Hong Kong, the subscriber can access all messages that were originally destined for the server in San Francisco directly from the server supporting the Hong Kong area. This permits the subscriber to obtain his messages locally while in Hong Kong, thereby avoiding long distance charges that would have been incurred had the subscriber received faxes originating directly from the San Francisco server.

Fax Messaging (Between Subscribers)

In the preferred embodiment of the present invention, a subscriber can also send a fax message to another subscriber. From a fax machine the sending subscriber calls a local server, logs in as a subscriber, enters the receiving subscriber's u-mail address using the telephone keypad as discussed above, and starts the fax transmission. Upon completion of the fax transmission, the server processes the document by converting it into a standard graphic format (BMP, JPEG, etc.), determines whether the targeted recipient subscriber belongs to the server or to a remote server on the Internet based on the u-mail address provided by the sending subscriber. If the targeted subscriber belongs to the server, the converted document is saved in the targeted subscriber's mailbox. Otherwise, the server includes the converted document in an email attachment and sends an email containing the attachment using the u-mail address to route the converted document to the targeted subscriber's server via the Internet. Upon receipt, the targeted subscriber's server processes the email message and attachment file by extracting the document from the attachment file and saving the document into the targeted subscriber's mailbox.

Alternatively, the subscriber can compose an email message or include a fax document as an attachment to the email message and have a destination server process the email message by extracting and saving the fax document in a targeted recipient subscriber's mailbox. The email message is routed to the destination server using the u-mail addressing convention discussed above.

INTERNET VOICE MESSAGING SERVICE

Voice messaging service between subscribers and non-subscribers across the Internet is also supported in the presently preferred embodiment of the present invention. A user sends or receives voice messages through a local telephone network linked to a server which processes and routes the messages to a destination server linked to the Internet. Using the Internet to communicate between linked servers avoids long distance charges that would otherwise be encountered for voice mail messages sent or received through long distance phone lines.

The types of voice messaging supported are: 1) subscribers sending voice mail to non-subscribers by telephone; 2) subscribers sending voice mail to non-subscribers by email; 3) subscribers sending voice mail to non-subscribers as a web page; 4) subscribers sending voice mail to non-subscribers as email; 5) non-subscribers sending voice mail to subscribers; and 6) subscribers sending voice mail to subscribers.

Voice Message to Voice Message

Figure 12:
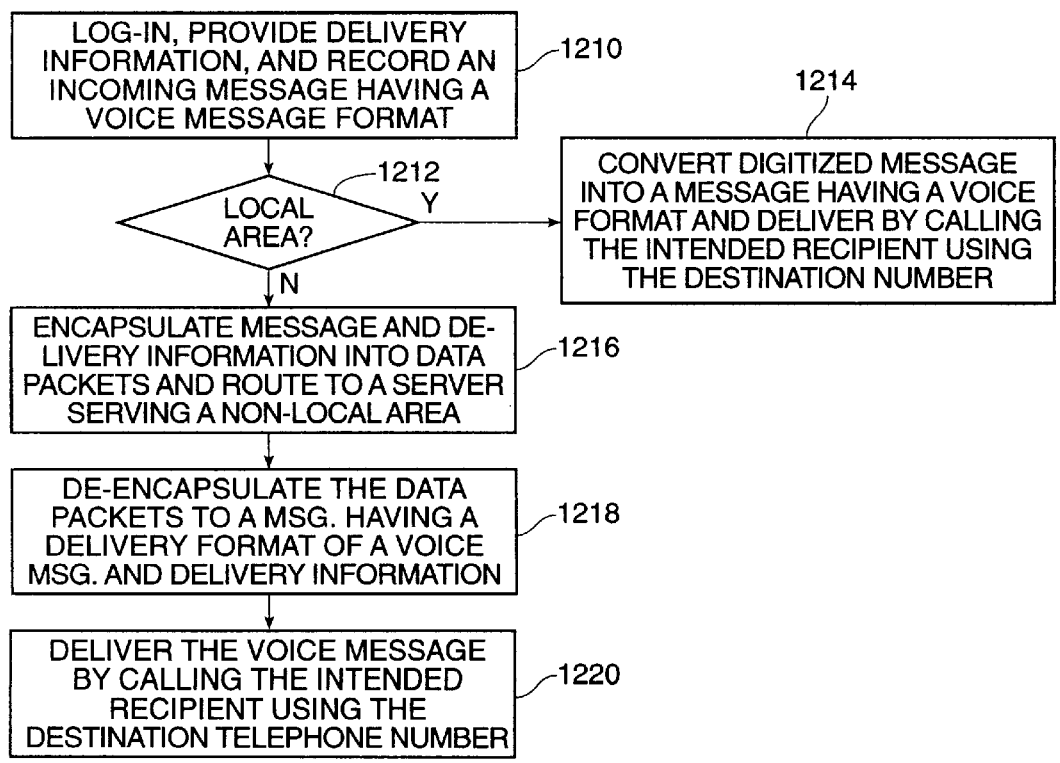
FIG. 12 is a schematic block diagram showing the operation of a voice to voice messaging mode in a presently preferred embodiment of the present invention.

FIG. 12 is a schematic block diagram showing the operation of a voice to voice messaging mode in a presently preferred embodiment of the present invention.

Figure 13:
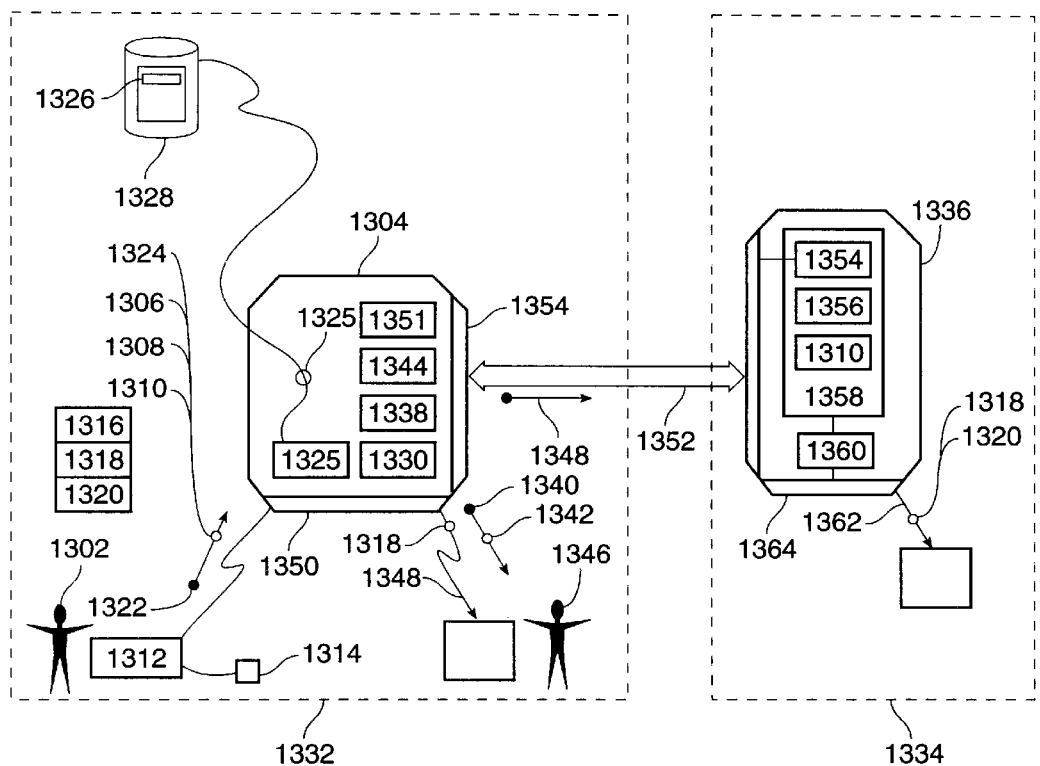
FIG. 13 is a schematic block diagram illustrating the use of messaging servers during the operation of a voice to voice messaging mode in a presently preferred embodiment of the present invention.

FIG. 13 is a schematic block diagram illustrating the use of messaging servers during the operation of a voice to voice messaging mode in a presently preferred embodiment of the present invention.

As shown in FIGS. 12 and 13, a subscriber can send a voice message to a non-subscriber by telephone. At step 1210 subscriber 1302 calls a local server 1304, logs-in as a subscriber by entering an ID 1306 and password 1308, and provides delivery information 1310 using a telephone 1312 and telephone keypad 1314 or similar device.

In this embodiment of the present invention, the delivery information 1310 includes a voice message delivery format 1316, an intended recipient's destination address such as a destination phone number 1318, and a name 1320 provided by voice. The subscriber 1302 also leaves an incoming message 1322 having a voice message format 1324, e.g., provides a message by talking on the telephone 1312. The incoming message 1322 is digitized into a digitized message 1325 by local server 1304 and stored in a location 1326 in memory 1328.

At step 1212, a routing program 1330 or equivalent device determines whether the destination address, i.e., the destination phone number 1318 is within a local area 1332 supported by local server 1304, or within a non-local area 1334 supported by a remote server 1336 by using a routing table 1338.

If the destination phone number 1318 is a phone number served by local area 1332, step 1214 is performed. At step 1214, local server 1304 converts the digitized message 1325 into a message 1340 having a voice format 1342 and uses a presentation program 1344 or equivalent means to deliver the message 1340 by calling an intended recipient 1346 using the destination phone number 1318 through a telephone network 1348 via a telephone interface 1350. When the call is answered, the server announces to the answering party that there is a message for a person using name 1320 as recorded by the subscriber 1302, and prompts the answering party to listen to the message.

Otherwise, if routing program 1330 determines that the destination phone number 1318 falls within non-local area 1334, step 1216 is performed.

At step 1216, local server 1304 encapsulates the digitized message 1325 into data packets 1348 using an encapsulation program 1351 or equivalent and routes the data packets 1348 to remote server 1336 that is suited to deliver the message within non-local area 1334 via a suitable network such as the Internet 1352 through an Internet interface 1354.

At step 1218, remote server 1336 converts the data packets 1348 to a message 1354 having a delivery format of a voice message 1356 and to delivery information 1310 using a de-encapsulation program 1358 or equivalent.

At step 1220, a presentation program 1360 or equivalent delivers the voice message by calling the intended recipient using the destination phone number 1318 through a suitable network such as a telephone network 1362 via telephone interface 1364. When the call is answered, remote server 1336 announces to the answering party that there is a message for a person using the name 1320 recorded by subscriber 1302, and prompts the answering party to listen to the message.

In an alternative embodiment of the present invention, the server may be configured to have the answering party enter a pass-code for identity. The pass-code is previously communicated by the subscriber to the recipient for security purposes.

Since only local telephone calls are involved, there is no long distance toll charge incurred. The actual fee, which would be significantly lower than long distance call, will be charged to the subscriber's account. The sending and receiving of the voice message are accomplished by using standard telephones, avoiding the need for the user to have an Internet account. The dialing of the local server telephone number and user ID can be simplified by programming into speed dialing or using an automatic dialer.

Voice Message Sent via Email

Figure 14:
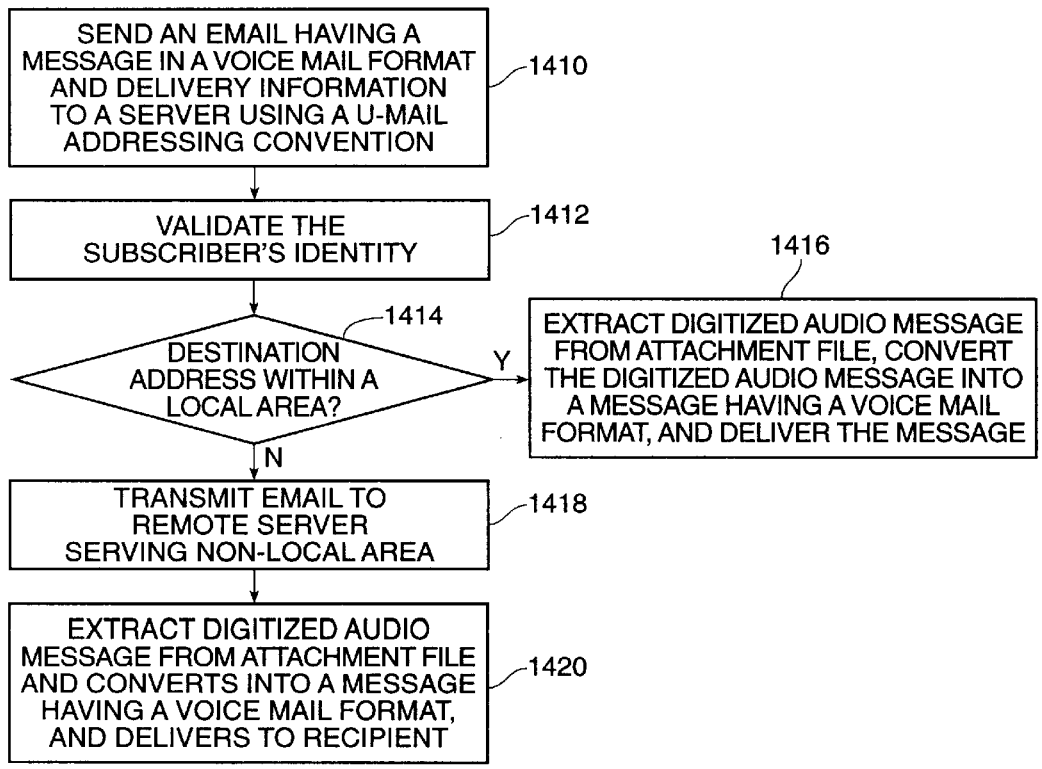
FIG. 14 is a schematic block diagram showing the operation of a voice sent via email messaging mode in a presently preferred embodiment of the present invention.

FIG. 14 is a schematic block diagram showing the operation of a voice message sent via email messaging mode in a presently preferred embodiment of the present invention.

Figure 15:
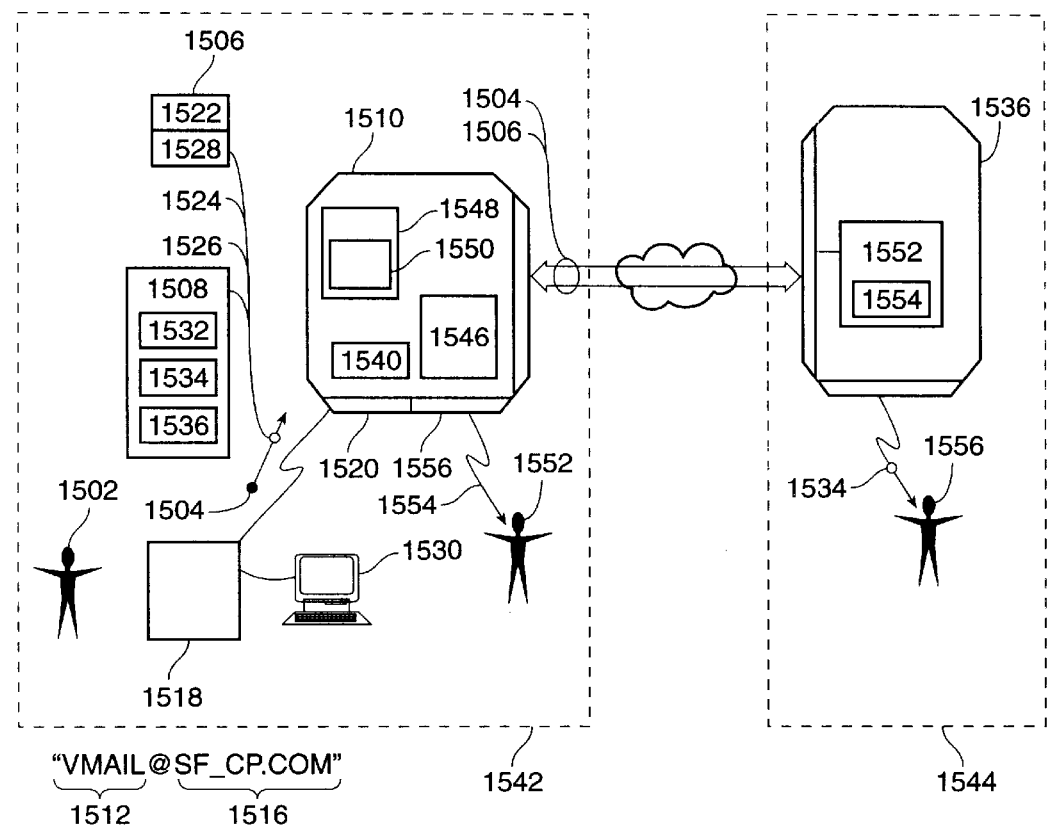
FIG. 15 is a schematic block diagram illustrating the use of messaging servers during the operation of a voice sent via email messaging mode in a presently preferred embodiment of the present invention.

FIG. 15 is a schematic block diagram illustrating the use of messaging servers during the operation of a voice sent via email messaging mode in a presently preferred embodiment of the present invention.

Referring now to FIGS. 14 and 15, a subscriber can also send message having a voice mail format to non-subscribers by email, if the subscriber has an email account. In FIG. 14 at step 1410, a subscriber 1502 sends an email 1504 with an attachment file 1506 and delivery information 1508 to a local server 1510 using the u-mail addressing convention discussed previously, e.g., "vmail@sf_cp.com", where the "vmail" portion 1512 indicates that the email should be transmitted to an intended recipient 1552 as a message having a voice mail format and where the "sf_cp" portion 1516 routes the email 1504 to a server in San Francisco.

The email 1504 may be sent through any suitable network that supports email messaging. To avoid over-complicating FIG. 15, email 1504 is shown being transmitted via a LAN 1518 through a LAN interface 1520.

It is presently contemplated that an incoming message 1522 having a voice message format 1524 and delivery information 1526 are sent as part of email 1504 to local server 1510. More particularly, the incoming message 1522 is sent as within email attachment 1506 and includes a digitized audio message 1528 such as a WAV file. For example, digitized audio message 1528 may be recorded from the subscriber's messaging interface 1530 having a sound card or any device capable of recording a voice message as a digitized audio message. The use of attachment file 1506 to hold incoming message 1522 is not intended to be the only approach but is simply one approach for sending incoming message 1522.

Besides the u-mail addressing convention for indicating a delivery format of voice mail, delivery information 1508 also includes destination address such as a destination phone number 1534 and the subscriber's password 1536. Delivery information 1508 may be placed at the first line of email message 1504 although such an approach is not intended to limit the present invention in anyway.

At step 1412 where upon receipt of incoming message 1522 and delivery information 1508, local server 1510 processes incoming message 1522 by validating the subscriber's identity. Validation includes checking the included password 1536 against the subscriber's email address.

At step 1414, a routing program 1540 or equivalent device determines whether the destination address, e.g., a destination phone number 1534, is within a local area 1542 supported by local server 1510, or within a non-local area 1544 supported by a remote server 1536 by using a routing table 1546.

If the local server 1510 determines that the destination phone number 1534 is within local area 1542, step 1416 is performed. At step 1416, local server 1510 extracts digitized audio message 1528 from attachment file 1506, converts the digitized audio message 1528 into a message 1548 having a voice mail format 1550, and delivers the message 1548 by calling the intended recipient using destination phone number 1534 which was sent as part of delivery information 1508. If the call is answered, the server announces to the answering party that there is a message for the person with the recorded name, and prompts the answering party to listen to the message.

The message may be sent through any suitable network supporting telephone transmission such as a telephone network 1554 via telephone interface 1556.

Otherwise, if the destination phone number 1534 is better served by remote server 1536, i.e., within non-local area 1544, step 1418 is performed. At step 1418, local server 1510 transmits email 1504 having attachment file 1506 to remote server 1536.

At step 1420 where upon receiving email 1504 having attachment file 1506, remote server 1536 extracts digitized audio message 1528 from attachment file 1506, converts it into a message 1552 having a voice mail format 1554, and delivers it by calling the recipient 1556 using destination phone number 1534 which was sent as part of delivery information 1508. If the call is answered, the server announces to the answering party that there is a message for the person with the recorded name, and prompts the answering party to listen to the message.

In an alternative embodiment of the present invention, each server within a group of servers may be configured to have the answering party enter a pass-code for identity. The pass-code is previously communicated by the subscriber to the recipient for security purposes.

Voice Message Presented Via Web Page

Figure 16:
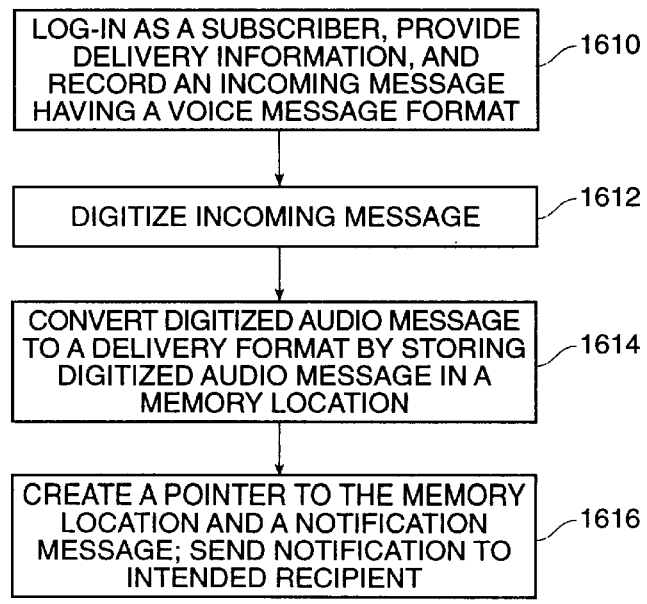
FIG. 16 is a schematic block diagram showing the operation of a voice presented as web page messaging mode in a presently preferred embodiment of the present invention.

FIG. 16 is a schematic block diagram showing the operation of a voice message presented via web page messaging mode in a presently preferred embodiment of the present invention.

Figure 17:
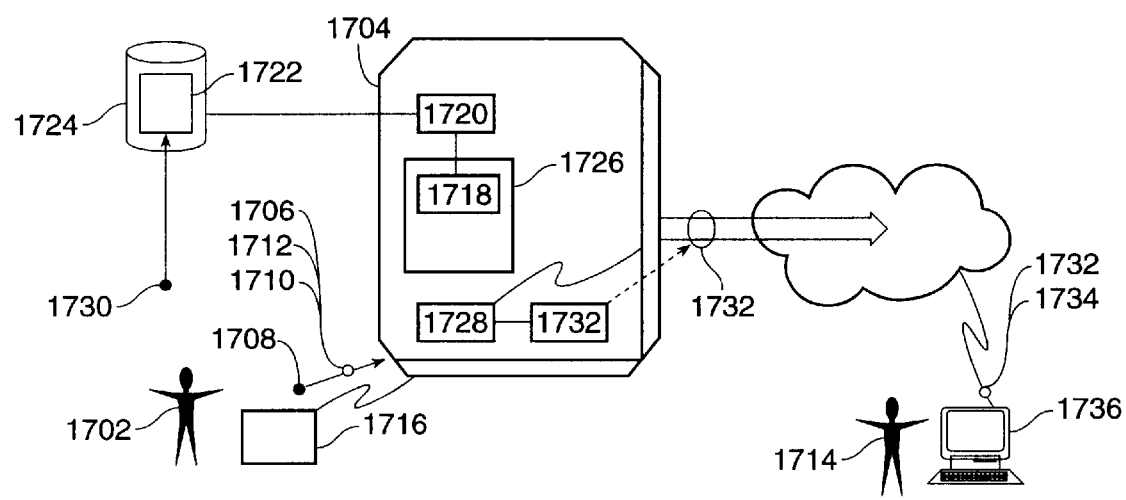
FIG. 17 is a schematic block diagram illustrating the use of messaging servers during the operation of a voice presented as web page messaging mode in a presently preferred embodiment of the present invention.

FIG. 17 is a schematic block diagram illustrating the use of messaging servers during the operation of a voice presented as web page messaging mode in a presently preferred embodiment of the present invention.

Referring now to FIGS. 16 and 17, a subscriber can also send a voice mail message to a non-subscriber using a web page or similar message format where the message is stored by a server and made accessible to a messaging interface such as a browser. At step 1610, a subscriber 1702 initiates a request by calling a local server 1704, logging in as a subscriber, providing delivery information 1706, and recording an incoming message 1708 having a voice message format 1710. The delivery information 1706 includes a destination address such as an email address 1712 of an intended recipient 1714. The destination address is entered though a telephone keypad 1716 or similar device by using the keypad coding scheme described above.

At step 1612, local server 1704 digitizes incoming message 1708 having voice message format 1710, resulting in a digitized audio message 1718.

At step 1614, a presentation program 1720 or equivalent converts digitized audio message 1718 to a delivery format by storing digitized audio message 1718 in a memory location such as a subscriber's mailbox 1722 within a subscriber mailbox database 1724. For example, the presentation program 1720 creates a web page 1726 that includes digitized audio message 1718, and stores the web page 1726 in subscriber's mailbox 1722.

At step 1616, a notification program 1728 creates a pointer 1730 to the memory location and a notification message 1732 having the intended recipient's email address 1712. The notification message 1732 may take the form of an email message. The notification program 1728 obtains email address 1712 from delivery information 1706.

In the presently preferred embodiment of the present invention, the pointer 1730 is a universal resource locator (URL) that points to a message included in a web page 1726. The URL is included within an HTML file which is included with notification message 1732 as an attachment file 1734. This permits an intended recipient to access the message such as digitized audio message 1718, presented in web page 1726 simply by launching the attachment file 1734 with a messaging interface such as a computer having a web browser 1736. Web page 1726 is configured to present the recipient with options for controlling access to digitized audio message 1718 over a suitable network such as the Internet so long as the messaging interface can support the accessing of digitized audio. This provides a subscriber the convenience of sending a voice message to anyone who has an email account and access to the Web through a web browser.

Voice Messages Received as Email

Subscribers may also send voice mail to non-subscribers as email. Unlike sending voice mail by using a web page, this option includes the entire digitized voice message stored in an email. This application is useful if the recipient does not have access to the Web although by default the voice message will be delivered as a web page.

Voice Messaging (Non-Subscribers to Subscribers)

The presently preferred embodiment of the present invention also enables non-subscribers to send a message having a voice mail format to subscribers. A non-subscriber calls a server having an intended recipient subscriber's mailbox. The server answers and prompts the non-subscriber to enter the intended recipient's mailbox ID and to record a message. The server saves the voice message in digital form in the intended recipient subscriber's mailbox for later retrieval.

Roaming and Virtual Mailbox

The subscriber mailbox can also be configured as a roaming or virtual mailbox, as previously described above.

Voice Messaging (Between Subscribers)

Voice mail messages can also be sent between subscribers. In the presently preferred embodiment of the present invention, the u-mail address scheme provides a convenient way for server subscribers to send voice messages to each other. Each voice mail message received by a server either from the Internet or from one of the network interfaces is stored in the intended recipient's mailbox for later retrieval. The subscribers can belong to the same server or to different server's on the Internet.

Sending a voice mail message occurs in the following way. A sending subscriber logs in to a local server in which the sending subscriber is a member, records a message, and enters the intended recipient subscriber's u-mail address using the telephone keypad, as disclosed above. The server stores the voice message in digital form and processes the request by determining whether the u-mail address corresponds to the local server or to a remote server by using a routing program and routing table.

If the u-mail address corresponds to the server, the message is stored in the intended recipient's mailbox for later retrieval. Otherwise, the server transmits the digitized voice message in packet form to the destination server over the Internet using the intended recipient's u-mail address. Upon completion of the transmission, the destination server restores the voice message into its digitized form and deposits the message into the intended recipient's mailbox based on the user name included in the u-mail address.

Similarly the sending subscriber can compose the voice message as an email and send it to the receiving subscriber's u-mail address. The server will check and deliver the voice message as described above. The originating subscriber does not need to know whether the recipient is a local or remote subscriber. The u-mail address offers the same identity as an email address, with the servers at both ends of the communication handling the actual delivery.

While illustrative embodiments and applications of this invention have been shown and described, it would be apparent to those skilled in the art that many more modifications than have been mentioned above are possible without departing from the inventive concepts set forth herein. The invention, therefore, is not to be limited except in the spirit of the appended claims.

What is claimed is:

1. A system for receiving and sending messages, the system including at least a first messaging apparatus and a second messaging apparatus, each messaging apparatus comprising:

a converter for converting an incoming message having a first format to a processed message having a delivery format, said converter converting said incoming message to said delivery format according to a format specified by delivery information provided by a user;

a first network interface linked to said converter and a first network, said first network interface including a means for transporting a message between said converter and at least one messaging interface linked to said first network;

a second network interface linked to said converter and a second network, said second network interface for transporting a message between said converter and at least one messaging interface linked to said second network;

means for delivering said processed message through said first network or through said second network in response to said delivery information;

wherein said first messaging apparatus is coupled to said second messaging apparatus through said first network;

wherein said first network interface communicates with a telephone network, said first network interface having a messaging layer for interpreting a destination address generated by a DTMF signal generator, said destination address generated including a "." symbol, an "@" symbol, and a ".com" symbol;

wherein said destination address follows an Internet Domain Name System addressing scheme; and said DTMF signal generator includes a telephone keypad;

said "." symbol generated by two successive DTMF signals with each signal corresponding to the "1" button on said telephone keypad;

said "@" symbol generated by two successive DTMF signals with each signal corresponding to the "1" button and the "2" button, respectively; and said ".com" symbol generated by two successive DTMF signals with each signal corresponding to the "1" button and the "3" button, respectively.

2. A method of interpreting an Internet address generated by a DTMF signal generator having an alphanumeric keypad, comprising the steps of:

associating two successive selections of a "1" button on the keypad with a "." symbol;

associating the successive selections of a "1" button and a "2" button on the keypad, respectively, with an "@" symbol; and associating the successive selections of a "1" button and a "3" button on the keypad, respectively, with a ".com" symbol.

3. A method as recited in claim 2, wherein said DTMF signal generator is a telephone.

4. A method as recited in claim 3, further including a step of generating numeric symbols comprising zero to nine by following a button selection for generating one of said numeric symbols with a "0" button selection.

5. An apparatus for storing and forwarding messages, the apparatus comprising:

a first network interface for interfacing with a first network;

a second network interface for interfacing with a second network;

means for receiving an incoming message and delivery information from said first network interface, said incoming message having a message content format of a first type;

a converter for converting said incoming message having a message content format of a first type to a message having a message content format of a second type in response to said incoming message and said delivery information, said converter using said delivery information for selecting said message content format of a second type for said message;

means for presenting said message having said message content format of a second type to at least one recipient specified in said delivery information, said message content format of a second type including a format where said message is stored in a location in memory, said location in memory pointed to by location information, said means for presenting having a means for creating a web page for presenting said incoming message; and wherein said delivery information includes a destination address, said destination address sent through a DTMF generator having a telephone keypad having a button signifying a ".", symbol, an "@" symbol, and a ".com" symbol, said symbols having a defined position on said button.

6. An apparatus as recited in claim 5, wherein said symbols are specified by a button having a digit corresponding to said defined position.

7. A system for receiving and sending messages, the system including at least a first messaging apparatus and a second messaging apparatus, each messaging apparatus comprising:

a converter for converting an incoming message having a first format to a processed message having a delivery format, said converter converting said incoming message to said delivery format according to a format specified by delivery information provided by a user;

a first network interface linked to said converter and a first network, said first network interface including a means for transporting a message between said converter and at least one messaging interface linked to said first network;

a second network interface linked to said converter and a second network, said second network interface for transporting a message between said converter and at least one messaging interface linked to said second network;

means for delivering said processed message through said first network or through said second network in response to said delivery information;

wherein said first messaging apparatus is coupled to said second messaging apparatus through said first network;

wherein said first network interface communicates with a telephone network, said first network interface having a messaging layer for interpreting a destination address generated by a DTMF signal generator, said destination address generated including a ".", symbol, an "@" symbol, and a ".com" symbol; and wherein said destination address follows an Internet Domain Name System addressing scheme; and said DTMF signal generator includes a telephone keypad;

said "." symbol generated by two successive DTMF signals with each signal corresponding to the "1" button on said telephone keypad;

said "@" symbol generated by two successive DTMF signals with each signal corresponding to the "1" button and the "2" button, respectively; and said ".com" symbol generated by two successive DTMF signals with each signal corresponding to the "1" button and the "3" button, respectively.

* * * * *

UNITED STATES PATENT AND TRADEMARK OFFICE
CERTIFICATE OF CORRECTION

PATENT NO: 5,974,449
DATED: October 26, 1999
INVENTOR(S): Jack H. Chang, Raymond L. Tong It is certified that error appears in the above-identified patent and that said Letter Patent are hereby corrected as shown below:

Col. 2, line 14, replace "is" with --are--.
Col. 2, line 32, replace "universal" with --uniform--.
Col. 9, line 3, replace "http:H/sf_cp.com/jdoe/play" with --http://sf_cp.com/jdoe/play--.
Col. 12, line 50, replace "english" with --English--.
Col. 13, line 63, replace "universal" with --uniform--.
Col. 14, line 27, replace "fax" with --faxes--.
Col. 17, line 2, delete "a" before the word message.
Col. 18, line 52, replace "universal" with --uniform--.
Col. 19, line 29, replace "server's" with --servers--.

Signed and Sealed this

Tenth Day of April, 2001

*Attest:*

NICHOLAS P. GODICI

*Attesting Officer*     *Acting Director of the United States Patent and Trademark Office*